(12) United States Patent
Cherneff et al.

(10) Patent No.: US 7,139,719 B1
(45) Date of Patent: Nov. 21, 2006

(54) SYSTEM FOR SCHEDULING PRODUCT PLANNING

(75) Inventors: Jonathan Cherneff, Cambridge, MA (US); Krishna Kumar, Cambridge, MA (US); John Fors, Menlo Park, CA (US)

(73) Assignee: i2 Technologies US, Inc., Dallas, TX (US)

( * ) Notice: Subject to any disclaimer, the term of this patent is extended or adjusted under 35 U.S.C. 154(b) by 809 days.

(21) Appl. No.: 09/684,076

(22) Filed: Oct. 8, 2000

Related U.S. Application Data

(60) Provisional application No. 60/158,650, filed on Oct. 8, 1999.

(51) Int. Cl.
*G05B 19/418* (2006.01)
(52) U.S. Cl. .................. 705/8; 705/7; 700/99
(58) Field of Classification Search .............. 705/8, 705/9, 7; 700/95, 99
See application file for complete search history.

(56) References Cited

U.S. PATENT DOCUMENTS

| | | | | |
|---|---|---|---|---|
| 5,111,391 A | * | 5/1992 | Fields et al. ............... | 705/9 |
| 5,548,518 A | * | 8/1996 | Dietrich et al. ............. | 700/100 |
| 5,787,000 A | * | 7/1998 | Lilly et al. .................. | 700/95 |
| 5,826,236 A | * | 10/1998 | Narimatsu et al. ........... | 705/8 |
| 5,864,480 A | * | 1/1999 | Ladd ........................... | 700/83 |
| 6,233,493 B1 | | 5/2001 | Cherneff et al. ............. | 700/95 |
| 6,249,715 B1 | * | 6/2001 | Yuri et al. ................... | 700/111 |
| 6,578,005 B1 | * | 6/2003 | Lesaint et al. ............... | 705/8 |

OTHER PUBLICATIONS

Supply Chain Planning Optimization: Just the Facts. May 1998, from The Report on Supply Chain Management. Copyright 1998 Advanced Manufacturing Research.*
AI Industry Shake-Out Shifts Into High Gear. Intelligent Systems Report, Jun. 1997, vol. 14, No. 6.*
British American Tobacco Licenses i2 Technologies' RHYTHM Supply Chain Management Software. May 21, 1997, from cached version, http://www.i2.com/web505/server_navigation/skeletons/i2_01/framework/navigation.cfm?contentid=E4CB349D-9E08-11D4-9EDF.*
Compaq Licenses i2's ATP, p. 4 of Intelligent Manufacturing, News in Brief, vol. 2, No. 9, Sep. 1997. http://www.lionhrtpub.com/IM/Imsubs/IM-9-97/News.html.*
Salmi, Janne. Improve your Profitability Through Chain Optimization. ROCE Partners, Apr, 1998.*
Fors, "System for Planning New Product Release," U.S. Appl. No. 09/688,032, pending, Oct. 8, 2000.
Fors, "System for Planning a Product Portfolio," U.S. Appl. No. 09/684,075, pending, Oct. 8, 2000.

* cited by examiner

*Primary Examiner*—Tariq R. Hafiz
*Assistant Examiner*—Johnna Loftis
(74) *Attorney, Agent, or Firm*—Steven J. Laureanti; James E. Walton

(57) ABSTRACT

A product development scheduler uses a distributed, constraint based system for modeling allocation of resources. All resources for all active development projects are provided at a central location, so that resources are not allocated twice across different projects. Real time availability of resources allows accurate modeling, and changes in resource status are reflected by the scheduler. Availability of materials are tracked through the supply chain to ensure true availability for planning purposes.

39 Claims, 5 Drawing Sheets

SYSTEM FOR SCHEDULING PRODUCT PLANNING

CROSS REFERENCE TO RELATED APPLICATIONS

The present application claims the benefit under 35 U.S.C. § 119(e) of U.S. Provisional Application 60/158,650, filed 8 Oct. 1999, titled SYSTEM FOR CONSTRAINT-BASED PROJECT SCHEDULING AND RESOURCE OPTIMIZATION, which is hereby incorporated by reference. This Application also contains material in common with co-pending U.S. application Ser. No. 09/684,075, filed Oct. 8, 2000, titled SYSTEM FOR PLANNING A PRODUCT PORTFOLIO, and with co-pending U.S. application Ser. No. 09/688,032, filed Oct. 8, 2000, titled SYSTEM FOR PLANNING A NEW PRODUCT RELEASE, both of which are hereby incorporated by reference.

BACKGROUND OF THE INVENTION

1. Field of the Invention

The present invention relates generally to scheduling systems, and more particularly to a system and method for scheduling development of a portfolio of new products to be developed in accordance with a development plan.

2. Description of the Prior Art

In today's marketplace, development of new products to be brought to market is becoming of increasing importance. In many industries, product life cycles are becoming shorter, increasing the importance of new product planning and introduction. Planning of new products is usually based upon a decision by management as to what new products will sell the best, and hopefully provide the best profit margins for the company.

Once a portfolio of products to be developed has been selected, it is necessary to implement scheduling controls to implement the plan. Feedback regarding the actual status of the various development projects is necessary to ensure that product development proceeds on schedule, or that trouble areas can be addressed.

With present systems, it is difficult to trace progress of the plan. Further, when problems occur with suppliers of needed materials, the adverse impact on the project schedule is usually found out just before the materials are needed. Competition between projects within a company can upset development schedules, because of lack of availability of needed resources.

It would be desirable to provide a product development scheduling system which allowed a company to better schedule its resources for product development projects.

SUMMARY OF THE INVENTION

In accordance with the present invention, a product development scheduler uses a distributed, constraint based system for modeling allocation of resources. All resources for all active development projects are provided at a central location, so that resources are not allocated twice across different projects. Real time availability of resources allows accurate modeling, and changes in resource status are reflected by the scheduler. Availability of materials is tracked through the supply chain to ensure true availability for planning purposes.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The system and method described below is useful for scheduling development planning projects, and for monitoring progress of those projects after they are initiated. The project scheduler is part of an overall system that begins with initial selection of products to be developed. The selection process generates an initial plan for its projects, which is then used during the development process. At the planning level, resources are allocated as an amount during a time period, which can be selected as one month, for example. During the execution phase, resources are allocated by program managers at a finer granularity, for example on a daily basis. Also, in the planning stage, individuals who will be performing particular parts of the work are not identified, but they are at the execution stage.

The following discussion begins with a description of the planning process used to generate a schedule to be used for product development. This is followed by a description of the details that specifically apply primarily to the execution of a development schedule in accordance with the preferred embodiment.

Figure 1:
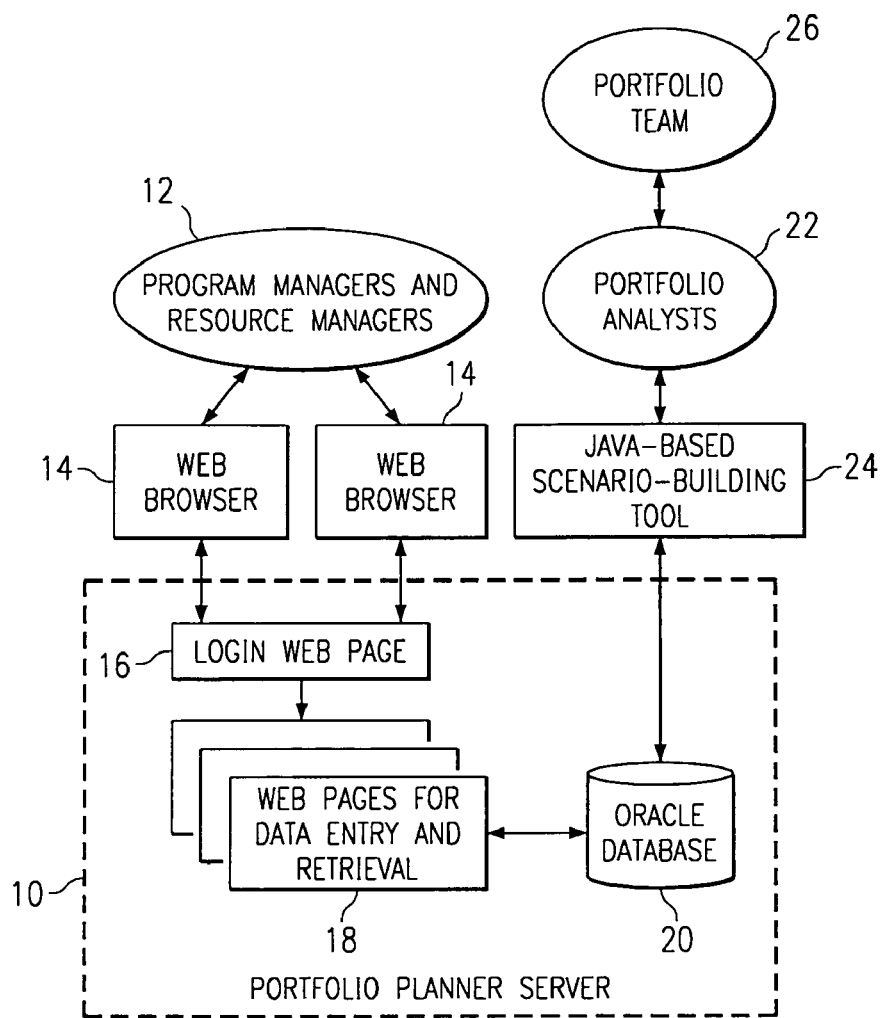
FIG. 1 is a diagram outlining a preferred new product planning process.

FIG. 1 illustrates the planning process generally at a high corporate level. The portfolio planner system resides on a server 10 which is accessed directly or indirectly by the various people involved in the planning process. Those people include program managers and resource managers 12 who preferably access the server 10 through one or more web servers 14. Program managers and resource managers 12 access a login web page 16 that gives them access to the underlying web pages 18 used to manipulate data and generally access an underlying database 20.

Portfolio analysts 22 access the portfolio planner server 10 through various scenario building tools 24 not available to program and resource managers 12. A portfolio team 26 makes final decisions as to which products are to be developed, and determines the various high level strategies to be implemented. They are assisted in their decision making by the analysts 22. It will be appreciated by those skilled in the art that this division of work is only a preferred suggestion, and other high level relationships will work with the system described below.

Figure 2:
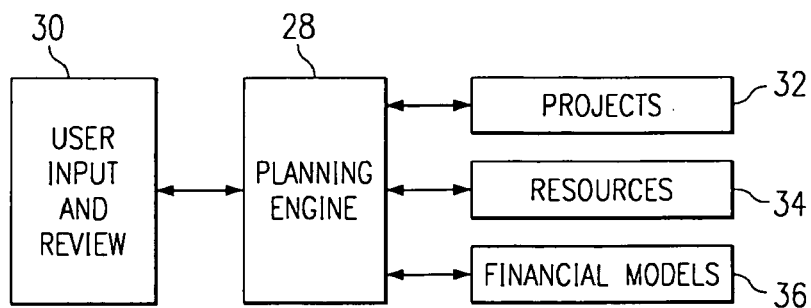
FIG. 2 is a high level block diagram illustrating a preferred approach to new product planning.

FIG. 2 indicates the type of information used by the system to develop an optimum portfolio. Planning engine 28 accepts inputs and generates development plans as described below. Users 30 both provide initial inputs to planning engine 28, and assess results that are generated. Planning engine 28 uses various types of data as inputs, and modifies data as the planning process proceeds. Data regarding projects 32 is used to define what steps are necessary to develop each new product under consideration. Data regarding the resources 34 available to develop new products is required, as is information regarding the financial models 36 that project the impact on profits of developing each product by a set of introduction dates.

A feature that adds to the usefulness of this system is that forward looking financial models are incorporated into the development planning strategy. Because late product introduction can have such a devastating impact on the profit contribution made by a product over its lifetime, it is necessary to consider timing effects in order to develop a useful product development plan. As is discussed in more detail in connection with FIG. 6, the present system provides that different profit projections be provided for various new product introduction dates.

Some portions of the preferred system are similar in nature to planning systems known in the art. Various portions of the preferred system are described in connection with FIGS. 3 through 5.

Figure 3:
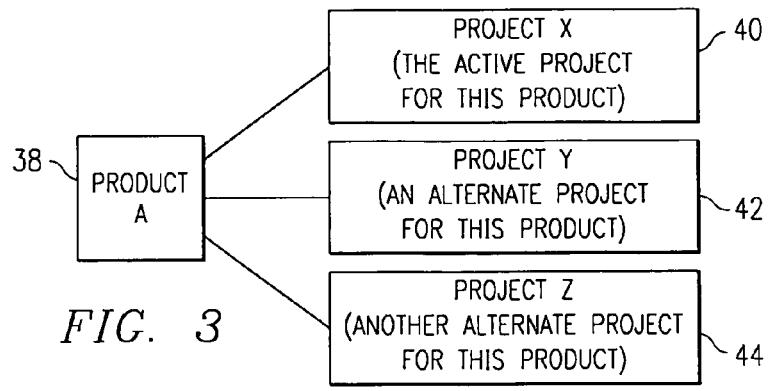
FIG. 3 is a diagram illustrating the use of alternative projects for developing a product.

Referring to FIG. 3, each product under consideration for development may be developed by one or more alternate projects. In this example, Product A can be developed by a project X 40, which is currently selected as the active project for this product. Only one development project is planned for any single product to prevent different development projects for a product from being pursued simultaneously. Portfolio planners can select alternate projects, such as project Y 42 or project Z 44, to assess the impact on overall profitability and scheduling of these alternate projects, but only one project at a time is selected.

Figure 4:
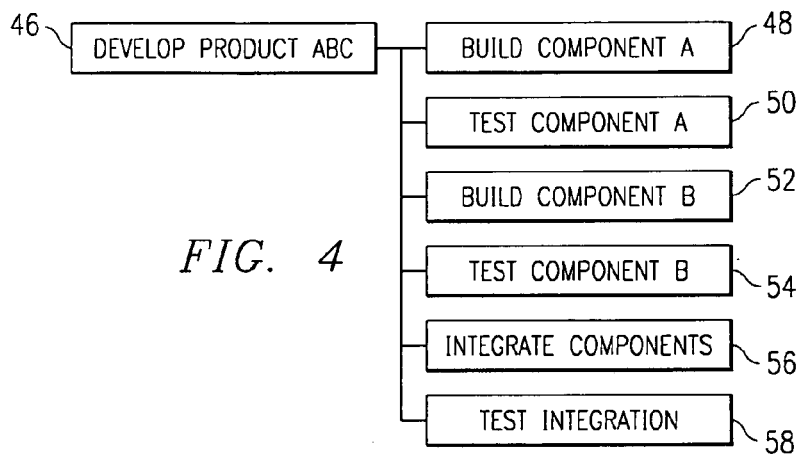
FIG. 4 is a diagram illustrating a plurality of tasks contained in a project

Referring to FIG. 4, any given project 46 is comprised of a sequence of tasks. A simplified sequence of tasks 48–58 is shown in FIG. 4, and assumes that two components are needed to be developed to come up with a new product. In many cases, many of the components in a new product can be reused from earlier products, and integrating them is the primary concern.

Tasks have constraints that are used to sequence them for planning purposes. Some tasks must be completed before others, and a set of constraint rules is provided to enforce the proper ordering. Other tasks can be complete in parallel, with component development not depending on the development of some of the other product components. These relationships are expressed as a set of constraint rules for each project. The Planning engine enforces these constraints when scheduling development of products. The constraints are especially important when multiple products are being scheduled for concurrent development, which is the most common scenario in which the present system is useful.

Figure 5:
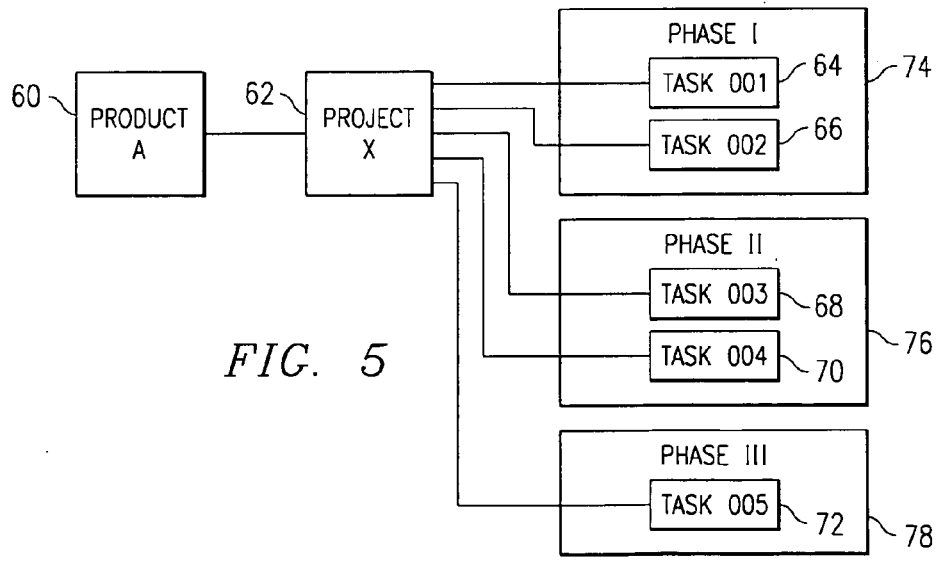
FIG. 5 is a diagram illustrating a project having tasks organized in phases

Projects may be broken down into phases, which are simply collections of related tasks as defined by those using the system. Referring to FIG. 5, a product A 60 is to be developed through project X 62, which in turn consists of tasks 64–72. These tasks are shown as broken into 3 phases 74, 76, 78, which occur in sequential order. In a planning situation where it is presumed in advance that not all development projects will proceed to completion, the use of project phases can enhance the accuracy of the portfolio projections.

Each task requires certain resources. These can be defined as, for example, a certain number of person days to be made available during a specified timeframe by a specified resource. Each resource has a capacity, defined as the number of person days which are available. This capacity can change over time, and in particular can change depending upon the day of the week, the amount of overtime that can be worked, the impact of holidays, etc. The process of scheduling projects involves scheduling tasks, which uses up available resources. As schedules are developed, the available resources diminish.

When there is a possibility that a project will not be completed, a probability of completion can be assigned in advance to each phase of the project. For example, it can be assumed that the initial phase 74 of the project is 100% likely to be performed. Whether product development continues will depend on the results of the first phase, and a probability of 80% can be assigned, for example, to second phase 76. In this example, assume that the probability of executing the third phase 78 is 50%, once the second phase is completed.

The resources that will be used by project 62 are multiplied by the appropriate probabilities when resource allocation is performed at the planning stage. Thus, the resources that would be needed by the second phase 76 are multiplied by 0.8 to take into account the lesser probability that they will be needed at all. For the third phase 78, the required resources are multiplied by 0.8*0.5=0.4, because the third phase depends on both a decision to be made after second phase 76 completion (50%) and the probability that the second phase will be performed (80%). The resources normally required for each phase are multiplied by the product of all preceding phase probabilities to reach a resource allocation multiplier for that phase for planning purposes.

An important part of the preferred system is the inclusion of financial modeling in the product development planning process. As described above, expected profits over the lifetime of a product are a function of the introduction date of the product, as well as numerous other factors. In general, creating a model projecting the financial return to be expected for a product is known in the art. The preferred system requires that a series of financial projections be run in order to assist the planning process.

Figure 6:
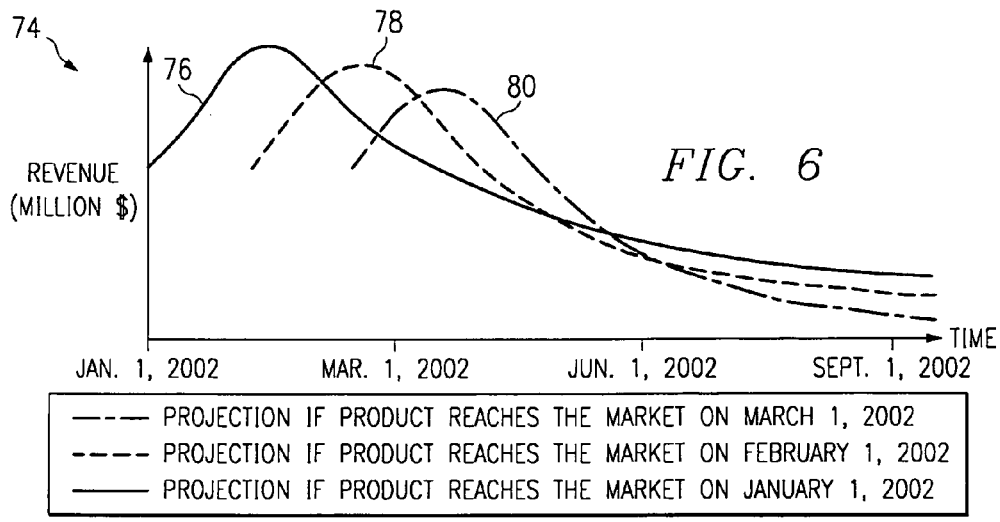
FIG. 6 is a sample set of financial projections over time.

FIG. 6 illustrates a simple example of the time element as it relates to the project projections used in the preferred embodiment. A graph 74 includes three profit curves 76, 78, 80 which are shifted in time to represent different product introduction dates. In this example, the peaks of the curves diminish as the product is introduced later. At some point, there may be only minimal profits if the product is introduced too late. The total profits over the lifetime of a product is found by integrating user the separate profit curves.

Each possible product introduction date will have a corresponding overall profit figure associated with it. Some products may be relatively insensitive to the date of introduction; these products can be developed to be introduced an any convenient time. Other products are extremely time sensitive, and must be developed as quickly as possible. The time impact on product contribution to corporate profits is used as part of the data considered in the optimization process.

Figure 7:
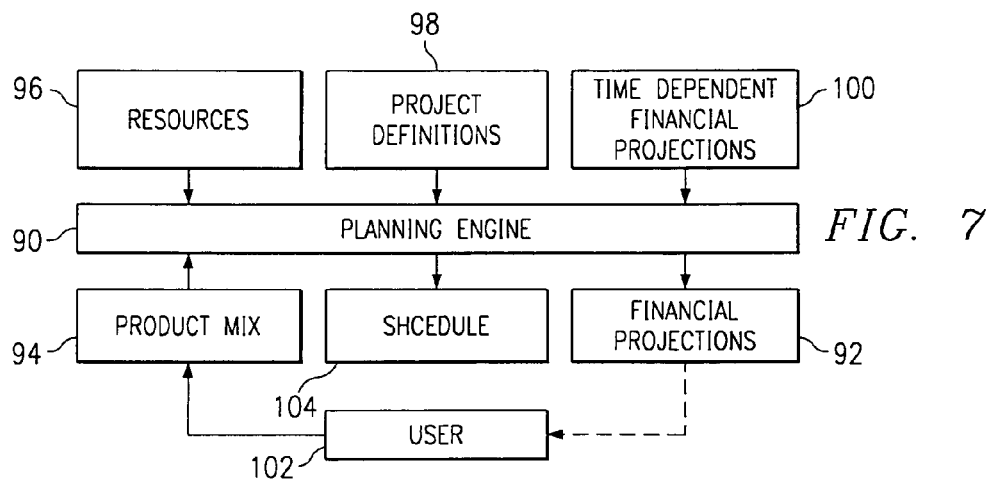
FIG. 7 is a data flow diagram illustrating utilization of the preferred planning system.

The portfolio planning process is a process of optimizing a set of inputs to maximize an output value. In the preferred system, the output to be maximized is the overall profit to be made by products to be developed. This is shown in FIG. 7, in which a planning engine 90 generates an output financial projection 92 consisting of the expected profit to be generated by a given product mix 94. Product mix 94 is provided as an input to planning engine 90, and defines the products that are in the portfolio and available for consideration. Data defining available resources 96, project definitions 98, and time dependent financial projections 100 are also provided.

As described above, resources 96 is a list of all available resources needed to develop new products. Not all resources available to the company need be considered; only those that relate to new product development are of interest. Project definitions 98 are the list of tasks required to develop each possible product, as described above. The financial projections 100 are also as described above. Project definitions 98 and financial projections 100 are provided separately for each possible product to be developed. Resources 96 includes all resources that are available.

The planning process begins when a possible portfolio of new products is provided as the product mix 94. Planning engine 90 generates a schedule 104 for product development in the traditional manner, utilizing the sequence and timing constraints contained in the project definitions. Development projects are scheduled utilizing available resources, and the completion dates for the various projects under consideration generates a dollar number for each product based upon introduction date. Part of the scheduling process is the selection of which products are to be developed; this list is preferably chosen to maximize overall projected profit. A user determines whether the financial result and plan is suitable, and may change the product mix if necessary. The planning process is an open loop process, with the user changing the portfolio in order to determine the impact on overall profitability.

As is normally the case, the scheduling process balances weighted interests to generate a best overall schedule according to its inputs. The present system uses financial projections, which differ depending on introduction date, as a weighted factor in the optimization process. Thus, products which lose significant profitability if they are introduced late are more likely to be scheduled for fastest introduction, while less time sensitive products may be scheduled later. Of course, those products that contribute the most to profitability have a priority in the scheduling process.

In addition to the projected profit number 92, the present system also generates a schedule to control the development process. This schedule is used by project managers to determine their deadlines so that overall corporate schedules and profit targets can be met.

The schedule 104 generated by planning engine 90 is at a higher level than needed to implement the plan. Schedule 104 allocates resources by function, but does not performed a detailed allocation. The detailed allocations are taken care of by a separate scheduler that accounts for resources at a more detailed level, and accepts feedback regarding the progress of the various development projects selected with the planning engine 90.

During the planning stage, resources are preferably dealt with at a higher level than is needed for detailed scheduling. The same is true for scheduling of tasks; larger tasks often need to be broken down into subtasks at the scheduling level in order to effectively schedule resources and monitor progress. At the same time, financial considerations are not part of the detailed scheduling process, and so are not included once the portfolio mix has been determined.

Figure 8:
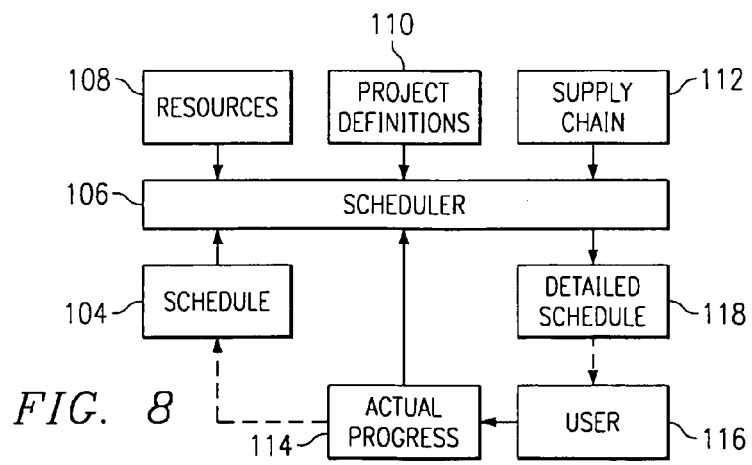
FIG. 8 is a data flow diagram illustrating use of a preferred development scheduler.

FIG. 8 shows the data flow for the development scheduler that corresponds to FIG. 7 for the portfolio planner. Referring to FIG. 8, schedule 104 is used as the initial input to scheduler 106. Resources 108, project definitions 110, and supply chain information 112 are also used as inputs to scheduler 106. As described below, resources 108 and project definitions 110 are similar to, but more detailed than, resources 96 and project definitions 98 used with the planning engine 90.

Scheduler 106 tracks actual progress of all projects 114 for the company, based upon input by users 116 who track tasks as they are completed. Scheduler 106 generates a detailed schedule 118 that can be used by people in the company to plan their development schedules.

Figure 9:
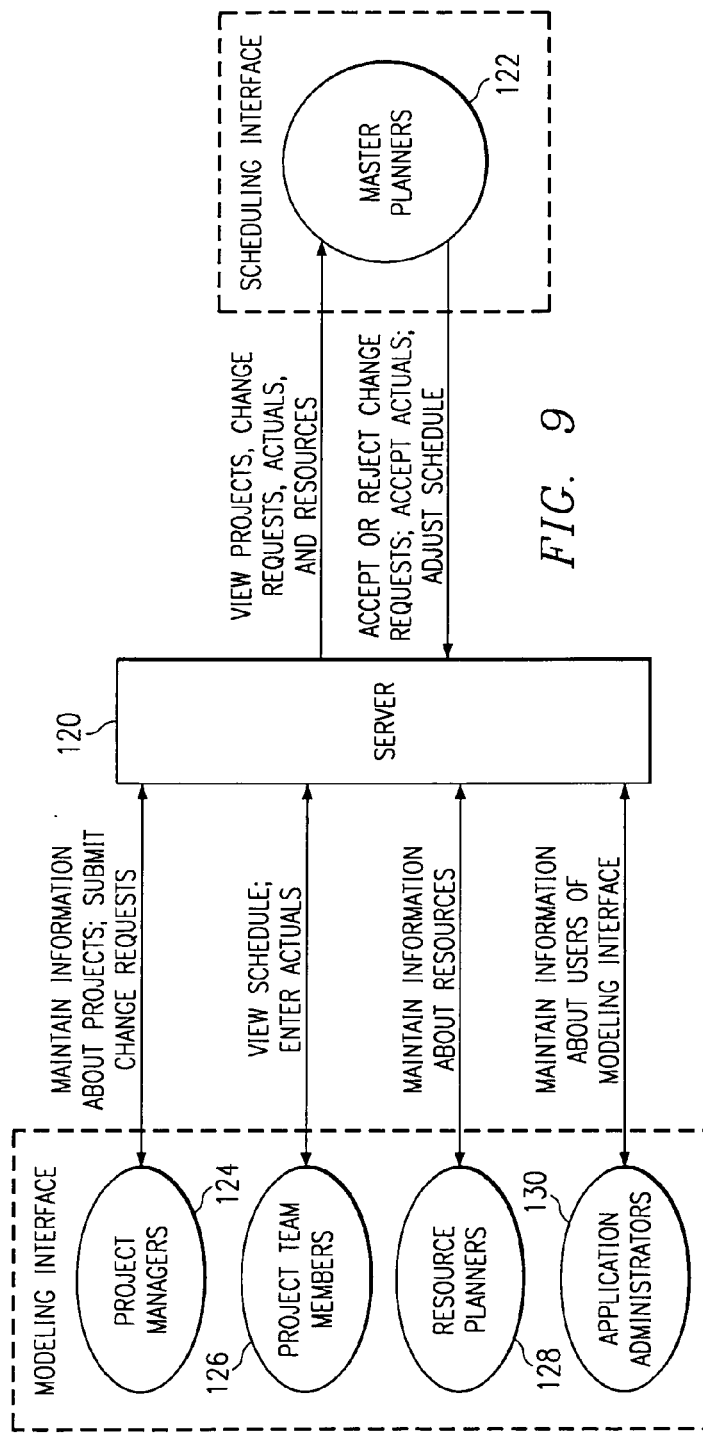
FIG. 9 is a diagram illustrating operation of a scheduling system by various users.

While the portfolio planner is used primarily by strategic management, the development scheduler is used primarily by project managers and resource managers. The preferred relationship between the various users and the scheduler is illustrated in FIG. 9. The scheduling system is implemented on server 120, where it can be accessed by all users that need access. In this diagram, master planners 122 are the strategic managers responsible for selecting the product mix as described above. Their responsibility does not completely cease once the portfolio has been defined, however, because schedules may need to change as a result of unplanned or unforeseen circumstances. Generally, the master planners 122 are not involved in the day to day operation of the scheduler 120, but only become involved if a change is needed to the schedule.

Project managers 124 are a primary user of the scheduler. They maintain detailed information about their projects, and define low level changes that need to occur. If the master schedule calls for a project to complete two tasks during a particular month, it is the project manager's task to ensure that the tasks are actually completed. A detailed schedule is generated by the scheduler, and followed by the project team to the extent possible. The original schedule 104 generated by the planning engine 104 is broken down into the required level of detail by the scheduler.

Project team members use the scheduler to view their schedule, and enter data showing the actual progress made. As tasks are completed, this data is entered into the scheduler so that progress can be confirmed as meeting the schedule. Details of the schedule may have to be changed depending on the progress actually made. Unless these changes will impact any deadlines set in the master schedule, no approval is required from master planners 122.

Resource planners 128 use the scheduler on server 120 to monitor and update the status of the resources for which they are responsible. If the capacity of a resource changes, this information is entered into the scheduler. Loss of capacity may impact the ability to meet scheduled deadlines, which raises a flag to project managers 124 and may require intervention by master planners 122. Resource planners are also responsible for ensuring that required materials are available. Because some of the required materials are obtained from outside suppliers, resource planners 128 use supply chain tools, such as those available from i2 Technologies, to track suppliers and ensure that all required materials are ready in time. If required, materials will not be ready, the effect on the schedule is the same as if a required resource would not be available. This may again necessitate a change to the schedule by master planners 122.

Application administrators 130 monitor functioning of the system, and assist others in using it. They generally have no input regarding schedules.

Application administrators monitor functioning of the system, and assist others in using it. They generally have no input regarding schedules.

During the portfolio planning stage, tasks are defined at a relatively high level. A task could be, for example, to test a product or a component of a product. This test might take a relatively long period of time, perhaps several weeks, and use several different resources. For detailed scheduling purposes, it is preferable to break tasks down into smaller pieces in order for them to be more effectively scheduled.

Figure 10:
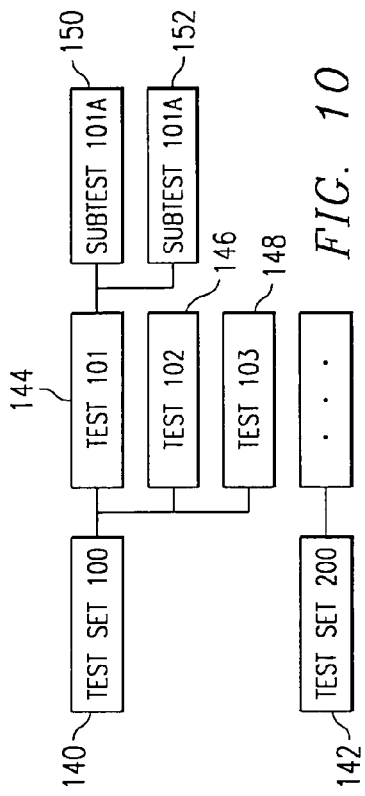
FIG. 10 is a block diagram illustrating subtasks.

FIG. 10 shows a task broken down into subtasks. Task 140 is a test set, and comes sequentially before task 142 as described above. This is a sufficient level of detail for planning purposes, but is presumed for this example to be insufficient in detail for scheduling purposes. Task 140 has three subtasks 144, 146, 148 that are performed in sequential order. As described above, subtasks may be concurrent if that is appropriate. Sequential tasks are defined by constraints associated with the task, that requires certain tasks to be completed before others begin.

Subtasks may in turn be broken into smaller subtasks, as is shown. Subtask 144 has two further subtasks 150, 152, which may be performed either sequentially or concurrently. The levels of subtasks can extend down as far as necessary to properly define a higher level task.

Each leaf subtask on the task hierarchy tree, subtasks 150, 152, 146, and 148 in FIG. 10, has associated with it one or more resources. The resources needed for task 140 is the sum of all resources needed for its subtasks. Because standard tasks may comprise a fairly complex set of subtasks, they may be pre-stored as templates to be used whenever the task is required. This simplifies the planning and scheduling process, because the details of each task are generated carefully once, and reused many times. The high level time and resources required for a task are used by the portfolio planner; the details contained in the subtasks are used by the detailed scheduler.

Figure 11:
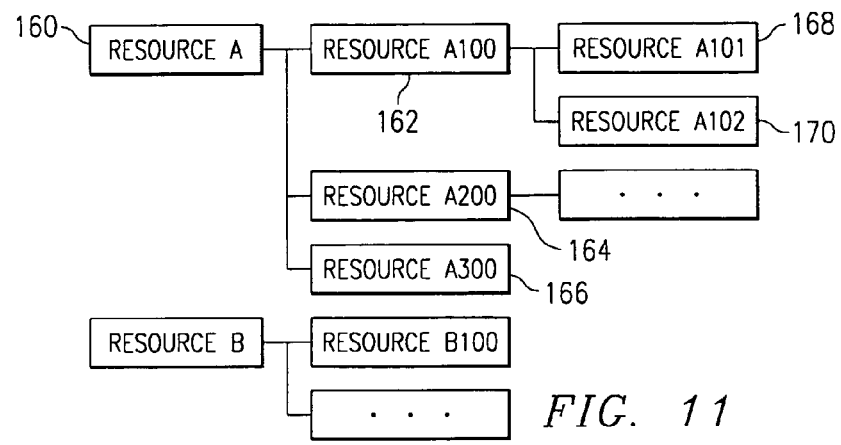
FIG. 11 is a diagram illustrating the uses of different layers of resources.

In a similar manner, resources are preferably defined in a hierarchy, as illustrated in FIG. 11. In this example, resource A 160 is comprised of three separate sub-resources 162, 164, and 166. Resources 162 are further broken into a lower level of resources, with resources 168 and 170 making resource 162. the details of resource 164 are omitted for simplicity in explanation.

The resource hierarchies are defined to match resources as they are actually applied within the company. At the lowest sub-level, a resource could comprise a single person, or a group that works as a unit. For example, resource 160 could be defined as the testing department, with resource 162 being the user interface group, and resources 168 and 170 being testing teams or individuals. The lowest levels of subtasks 150, 152 will generally require resources at the lowest, detailed levels.

At the portfolio planning level, resource 160 is used in the aggregate by defining a number of testing days available during a month and being allocated on that basis. During detailed scheduling, the testing teams to be used must be identified when the project is scheduled. The hierarchical definition of tasks and resources described herein allows for higher level plans to be easily allocated to lower level tasks and resources. Depending on the nature of specific tasks and resources, lower levels may have to be used even during portfolio planning. However, in many instances this will not be necessary, and the details can be hidden by layers of hierarchical levels.

The scheduler preferably operates as follows. High level schedule 104 is provided, and scheduled in the normal manner for a relatively short future time period. For example, if the planning schedule is determined in months, and the detailed schedule operates in units of days, a detailed scheduling window might extend only 3 months into the future. After that time, high level tasks are scheduled using high level resources in accordance with the master plan. Lower levels of tasks and resources are only scheduled during the detailed scheduling window.

Figure 12:
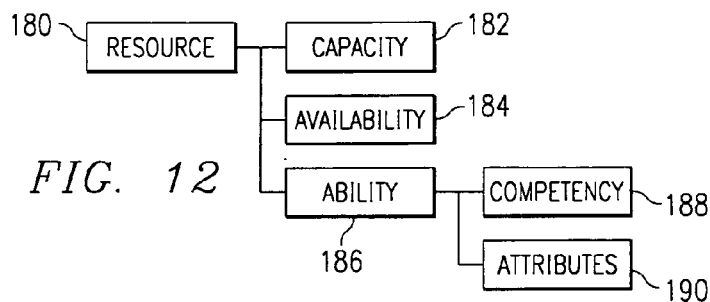

FIG. 12 shows the information used to define each resource 180. Each resource 180 has a capacity 182, defined as the number of hours that the resource can work in a day. These may be broken down into normal and overtime hours if the resource is capable of overtime hours.

Each resource 180 also has an availability 184, which is basically a calendar of when the resource is available. Assuming the resource to be a single person, for example, vacation schedules, holidays, and other calendar information must be provided. Availability as calendared here modifies the capacity values described with relation to box 182.

Each resource also has an ability 186, which is a general term for the type of work that can be performed by the resource. Ability is further broken down into attributes 190, which describes the types of work that can be performed by the resource, and competency 188, which describes how well the resource can do the job. A resource 180 can have several different attributes, if desired and appropriate, and corresponding competencies for each attribute. These abilities are used to match tasks with appropriate resources.

Figure 13:
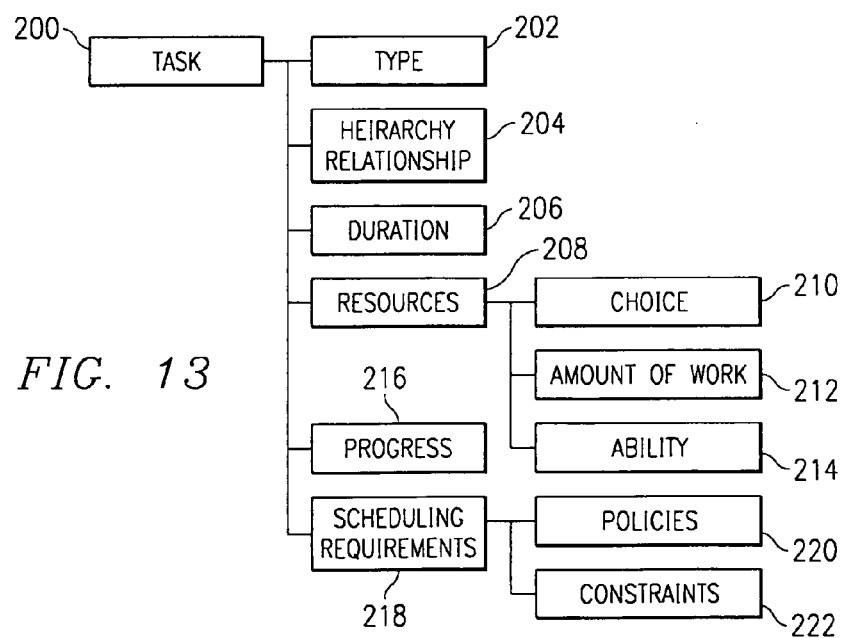

Tasks also have a definition, as shown in FIG. 13. Task 200 is assigned a type 202, which is generally defined to be a work task. Work tasks have one or more resource requirements. A task may also be given a type of milestone, which is simply a placeholder used for management purposes to indicate that a project milestone has been reached. Milestone tasks have neither resource requirements nor a duration.

Hierarchy relationship 204 is where the pointers to related tasks are stored. The hierarchy relationships among tasks are what defines the task hierarchies described previously. Precedence relationships between, the sequencing between them, are also defined here. Duration 206 is simply a time that the task will take to complete. When a task is scheduled, the user specifies the resources needed and the duration. Preferably, an additional time buffer can be specified, which is an additional allowed amount of duration in which the task can be completed.

Resources 208 are assigned to tasks. A task may require more than one resource, but a single resource is usually needed for a single task. Resource requirements are associated only with tasks that do not have subtasks; the resources for a task having subtasks are defined to be those of its children.

Several different aspects of resources must be defined. These are choice 210, amount of work 212, and ability 214. Choice 210 actually specifies the resource to be used. This may be a top level selection, in which case the scheduler is free to select any appropriate sub-resource to accomplish the task. In some cases, the individual resource may need to be specified, in which case that particular resource will be used. The amount of work 212 includes both duration, in days in the preferred embodiment, and load, expressed as the capacity, in hours per day, that the resource requirement uses.

Ability 214 is the requirement for a minimum competency or experience level for the resource. If a higher competency resource is used for the task, the duration may be shortened by an amount proportional to the skill differential. The change to duration based upon competency is completely application dependent, and must be defined in advance.

Progress 216 preferably includes the actual date the task was started, the completion date if it has been completed, and the estimated remaining duration if the task has been started but not yet completed. This information is generally updated by project team members as tasks are performed.

Scheduling requirements 218 can be considered generally as policies 220 and constraints 222. Policies 220 indicate how constraints should be enforced. This includes flags indicating whether additional duration can be used, and whether certain constraints are to be enforced. Constraints 222 points to the constraints to be used in scheduling this task.

Constraints are of several types. Some constraints are built into the scheduler, such as the constraint that a resource cannot be used simultaneously by two resources, and that precedence relations will be enforced. Also, tasks that require material resources are not scheduled until the materials are available. Others are controlled by the users, and can be changed as part of the modeling process to study alternative scenarios. These include fixed start and completion dates, allowable delays between sequential tasks, whether or not overtime is allowed to complete a task, and penalties for differences in location for resources used in the same task or project.

Once all of the described information is completely specified, the system preferably uses genetic algorithms to determine optimum schedules that meet all of the constraints. By changing task and resource constraints, and specifying certain resources and task dates, a schedule is generated that meets all of the goals originally set in the portfolio plan, and is attainable by the resources available. Because of the fast computational nature of genetic algorithm programs, numerous what-if scenarios can be computed in a reasonable time.

While the invention has been particularly shown and described with reference to a preferred embodiment, it will be understood by those skilled in the art that various changes in form and detail may be made therein without departing from the spirit and scope of the invention.

What is claimed is:

1. A method for scheduling development planning for a plurality of products of an enterprise, comprising:

Receiving a list of a plurality of products to be developed; receiving a list of required completion dates, each completion date specifying the completion date for the development of a corresponding product in the plurality of products; receiving, for each product in the plurality of products, a project definition of a project for developing the product, each project definition defining: a plurality of phases associated with the project for development the product, the plurality of phases having a plurality of tasks required to complete a project for developing the product associated with the project definition; and a list of resources required to complete each task defined in the product definition, at least one of the plurality of tasks for at least one of the plurality of projects requiring a material to be provided by an outside party distinct from the enterprise; receiving a list of available resources, each resource in the list of available resources comprises: a capacity level, representing a function of time available to each resource; an availability level, representing a function duration available to each resource; and an ability level, including at attribute level, representing a function of work characteristic capable of being performed by each resource and a competency level, representing a function of competence of each resource; receiving, for each task associated with each phase of the project definition requiring a resource, a specified minimum ability level of one of more resources to be used for that task; receiving a list of materials available from outside parties distinct from the enterprise and a schedule of availability of the materials available from the outside parties; and maintaining a scheduler operable to automatically generate a development schedule comprising all tasks for all projects, the development schedule allocating the resources such that each resource is allocated at a level less than or equal to its capacity, the development schedule also allocating the resources that have an ability level at least as high as the specified minimum ability level, the development schedule also scheduling tasks that require materials from outside parties at a time when such materials will be available; monitoring the materials identified in the list of materials from outside parties distinct from the enterprise using one or more supply chain tools operable to monitor the outside parties; and automatically modifying the development schedule based on material availability information obtained by the one or more supply chain tools.

2. The method of claim 1, wherein each task is associated with a task definition comprising at least one of:

type information identifying the type of task;

hierarchy relationship information comprising one or more pointers to one or more related tasks and information regarding a sequence for performing related tasks;

duration information specifying a quantity of time the task will take to complete;

resource information specifying one or more resources to be used and a desired ability; and progress information specifying progress of the particular task.

3. The method of claim 2, wherein the task definition further comprises scheduling requirements comprising one or more of:

one or more constraints associated with the particular task; and policy information specifying one or more rules for enforcing the one or more constraints.

4. The method of claim 3, wherein the one or more constraints comprise:

one or more built-in constraints provided by the scheduler; and one or more user-specified constraints.

5. The method of claim 1, wherein a particular task comprises a plurality of subtasks, a task definition for the particular task specifying the plurality of subtasks and an order in which the plurality of subtasks should be performed.

6. The method of claim 1, wherein the plurality of tasks are defined in a hierarchy specifying relationships among related tasks, at least one task comprising a plurality of sub-tasks, each sub-task being associated with an identification of one or more resources for performing the leaf task.

7. The method of claim 1, wherein a particular task in the plurality of tasks comprises a standard tasks for repeated use, the method further comprising storing a task definition for the particular task comprising a list of sub-tasks for performing the particular task and a list of resources for performing the sub-tasks in the list of sub-tasks.

8. The method of claim 1, wherein each available resource in the list of available resources is associated with a resource definition comprising:
   the capacity of the resource;
   availability of the resource; and
   ability of the resource comprising attribute information identifying a type of work associated with the resource and competency information indicating how well the resource performs the type of work identified in the attribute information.

9. The method of claim 1, wherein the list of available resources is defined in a hierarchy specifying relationships among related resources, at least one resource comprising a plurality of sub-resources.

10. The method of claim 1, further comprising:
   receiving project status information from a user, the project status information regarding the status of a project in the plurality of projects; and
   automatically modifying the development schedule based on the project status information.

11. The method of claim 1, further comprising:
   receiving resource status information from a user, the resource status information regarding the status of available resources in the list of available resources; and
   automatically modifying the development schedule based on the resource status information.

12. The method of claim 11, wherein the resource status information comprises a change in the capacity of a resource.

13. The method of claim 1, wherein the scheduler is operable to automatically generate the development schedule using a genetic algorithm.

14. A system for scheduling development planning for a plurality of products of an enterprise, comprising:
   a list of a plurality of products to be developed; a list of required completion dates, each completion date specifying the completion date for the development of a corresponding product in the plurality of products; for each product in the plurality of products, a project definition of a project for developing the product, each project definition defining: a plurality of phases associated with the project for development the product, the plurality of phases having a plurality of tasks required to complete a project for developing the product associated with the project definition; and a list of resources required to complete each task defined in the product definition, at least one of the plurality of tasks for at least one of the plurality of projects requiring a material to be provided by an outside party distinct from the enterprise; a list of available resources, each resource in the list of available resources comprises: a capacity level, representing a function of time available to each resource; an availability level, representing a function duration available to each resource; and an ability level, including at attribute level, representing a function of work characteristic capable of being performed by each resource and a competency level, representing a function of competence of each resource; for each task associated with each phase of the project definition requiring a resource, a specified minimum ability level of one of more resources to be used for that task; a list of materials available from outside parties distinct from the enterprise; a scheduler operable to automatically generate a development schedule comprising all tasks for all projects, the development schedule allocating the resources such that each resource is allocated at a level less than or equal to its capacity, the development schedule also allocating the resources that have an ability level at least as high as the specified minimum ability level, the development schedule also scheduling tasks that require materials from outside parties at a time when such materials will be available; the scheduler further operable to: monitor the materials identified in the list of materials from outside parties distinct from the enterprise using one or more supply chain tools operable to monitor the outside parties; and automatically modify the development schedule based on material availability information obtained by the one or more supply chain tools.

15. The system of claim 14, wherein each task is associated with a task definition comprising at least one of:
   type information identifying the type of task;
   hierarchy relationship information comprising one or more pointers to one or more related tasks and information regarding a sequence for performing related tasks;
   duration information specifying a quantity of time the task will take to complete;
   resource information specifying one or more resources to be used and a desired ability; and
   progress information specifying progress of the particular task.

16. The system of claim 15, wherein the task definition further comprises scheduling requirements comprising one or more of:
   one or more constraints associated with the particular task; and
   policy information specifying one or more rules for enforcing the one or more constraints.

17. The system of claim 16, wherein the one or more constraints comprise:
   one or more built-in constraints provided by the scheduler; and
   one or more user-specified constraints.

18. The system of claim 14, wherein a particular task comprises a plurality of subtasks, a task definition for the particular task specifying the plurality of subtasks and an order in which the plurality of subtasks should be performed.

19. The system of claim 14, wherein the plurality of tasks are defined in a hierarchy specifying relationships among related tasks, at least one task comprising a plurality of sub-tasks, each sub-task being associated with an identification of one or more resources for performing the leaf task.

20. The system of claim 14, wherein a particular task in the plurality of tasks comprises a standard tasks for repeated use, the system further operable to store a task definition for the particular task comprising a list of sub-tasks for performing the particular task and a list of resources for performing the sub-tasks in the list of sub-tasks.

21. The system of claim 14, wherein each available resource in the list of available resources is associated with a resource definition comprising:
   the capacity of the resource;
   availability of the resource; and
   ability of the resource comprising attribute information identifying a type of work associated with the resource and competency information indicating how well the resource performs the type of work identified in the attribute information.

22. The system of claim 14, wherein the list of available resources is defined in a hierarchy specifying relationships among related resources, at least one resource comprising a plurality of sub-resources.

23. The system of claim 14, wherein the scheduler is further operable to:
receive project status information from a user, the project status information regarding the status of a project in the plurality of projects; and
automatically modify the development schedule based on the project status information.

24. The system of claim 14, wherein the scheduler is further operable to:
receive resource status information from a user, the resource status information regarding the status of available resources in the list of available resources; and
automatically modify the development schedule based on the resource status information.

25. The system of claim 24, wherein the resource status information comprises a change in the capacity of a resource.

26. The system of claim 14, wherein the scheduler is operable to automatically generate the development schedule using a genetic algorithm.

27. Software for scheduling development planning for a plurality of products of an enterprise, the software being embodied in computer-readable media and when executed operable to:
Receive a list of a plurality of products to be developed; receive a list of required completion dates, each completion date specifying the completion date for the development of a corresponding product in the plurality of products; receive, for each product in the plurality of products, a project definition of a project for developing the product, each project definition defining: a plurality of phases associated with the project for development the product, the plurality of phases having a plurality of tasks required to complete a project for developing the product associated with the project definition; and a list of resources required to complete each task defined in the product definition, at least one of the plurality of tasks for at least one of the plurality of projects requiring a material to be provided by an outside party distinct from the enterprise; receive a list of available resources, each resource in the list of available resources comprises: a capacity level, representing a function of time available to each resource; an availability level, representing a function duration available to each resource; and an ability level, including at attribute level, representing a function of work characteristic capable of being performed by each resource and a competency level, representing a function of competence of each resource; receive, for each task associated with each phase of the project definition requiring a resource, a specified minimum ability level of one of more resources to be used for that task; receive a list of materials available from outside parties distinct from the enterprise and a schedule of availability of the materials available from the outside parties; and maintain a scheduler operable to automatically generate a development schedule comprising all tasks for all projects, the development schedule allocating the resources such that each resource is allocated at a level less than or equal to its capacity, the development schedule also allocating the resources that have an ability level at least as high as the specified minimum ability level, the development schedule also scheduling tasks that require materials from outside parties at a time when such materials will be available; monitor the materials identified in the list of materials from outside parties distinct from the enterprise using one or more supply chain tools operable to monitor the outside parties; and automatically modify the development schedule based on material availability information obtained by the one or more supply chain tools.

28. The software of claim 27, wherein each task is associated with a task definition comprising at least one of:
type information identifying the type of task;
hierarchy relationship information comprising one or more pointers to one or more related tasks and information regarding a sequence for performing related tasks;
duration information specifying a quantity of time the task will take to complete;
resource information specifying one or more resources to be used and a desired ability; and
progress information specifying progress of the particular task.

29. The software of claim 28, wherein the task definition further comprises scheduling requirements comprising one or more of:
one or more constraints associated with the particular task; and
policy information specifying one or more rules for enforcing the one or more constraints.

30. The software of claim 29, wherein the one or more constraints comprise:
one or more built-in constraints provided by the scheduler; and
one or more user-specified constraints.

31. The software of claim 27, wherein a particular task comprises a plurality of subtasks, a task definition for the particular task specifying the plurality of subtasks and an order in which the plurality of subtasks should be performed.

32. The software of claim 27, wherein the plurality of tasks are defined in a hierarchy specifying relationships among related tasks, at least one task comprising a plurality of sub-tasks, each sub-task being associated with an identification of one or more resources for performing the leaf task.

33. The software of claim 27, wherein a particular task in the plurality of tasks comprises a standard tasks for repeated use, the software further operable to store a task definition for the particular task comprising a list of sub-tasks for performing the particular task and a list of resources for performing the sub-tasks in the list of sub-tasks.

34. The software of claim 27, wherein each available resource in the list of available resources is associated with a resource definition comprising:
the capacity of the resource;
availability of the resource; and
ability of the resource comprising attribute information identifying a type of work associated with the resource and competency information indicating how well the resource performs the type of work identified in the attribute information.

35. The software of claim 27, wherein the list of available resources is defined in a hierarchy specifying relationships among related resources, at least one resource comprising a plurality of sub-resources.

36. The software of claim 27, further operable to:
receive project status information from a user, the project status information regarding the status of a project in the plurality of projects; and
automatically modify the development schedule based on the project status information.

37. The software of claim 27, further operable to:
receive resource status information from a user, the resource status information regarding the status of available resources in the list of available resources; and
automatically modify the development schedule based on the resource status information.

38. The software of claim 37, wherein the resource status information comprises a change in the capacity of a resource.

39. The software of claim 27, wherein the scheduler is operable to automatically generate the development schedule using a genetic algorithm.

* * * * *